United States Patent
Kikuchi

(10) Patent No.: US 9,344,614 B2
(45) Date of Patent: May 17, 2016

(54) IMAGING APPARATUS

(75) Inventor: Sunao Kikuchi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 924 days.

(21) Appl. No.: 13/569,704

(22) Filed: Aug. 8, 2012

(65) Prior Publication Data
US 2013/0107002 A1 May 2, 2013

(30) Foreign Application Priority Data
Oct. 26, 2011 (JP) .................. 2011-234794

(51) Int. Cl.
*H04N 13/02* (2006.01)
*H04N 5/232* (2006.01)
*H04N 5/33* (2006.01)

(52) U.S. Cl.
CPC ........... *H04N 5/232* (2013.01); *H04N 5/23229* (2013.01); *H04N 5/332* (2013.01); *H04N 13/0271* (2013.01)

(58) Field of Classification Search
CPC H04N 5/232; H04N 5/23229; H04N 13/0271
USPC .......................................................... 348/46
See application file for complete search history.

(56) References Cited

U.S. PATENT DOCUMENTS

2013/0033578 A1* 2/2013 Wajs .............. 348/46

FOREIGN PATENT DOCUMENTS

| JP | 2003-087806 A | 3/2003 |
| JP | 2008-542863 A | 11/2008 |
| JP | 2010-79298 A | 4/2010 |
| JP | 2012-22308 A | 2/2012 |
| JP | 2012-22309 A | 2/2012 |

OTHER PUBLICATIONS

Office Action dated Jul. 21, 2015, issued in counterpart Japanese Patent Application No. 2011-234794, with English translation (7 pages).

* cited by examiner

*Primary Examiner* — Gims Philippe
*Assistant Examiner* — Benjamin Pezzner
(74) *Attorney, Agent, or Firm* — Westerman, Hattori, Daniels & Adrian, LLP

(57) ABSTRACT

The imaging apparatus includes: a multiband image sensor with a light receiving surface which includes two-dimensional arrays of at least three visible light pixels and an infrared pixels, the visible light pixels having sensitivity in different visible light wavelength ranges, the infrared pixels having sensitivity in the infrared wavelength range; a coded aperture which is disposed on the light receiving surface side of the multiband image sensor and serves as an aperture in a predetermined shape with respect to light in the wavelength range in which the infrared pixel has sensitivity while directly transmitting light in other wavelengths; and a processor for processing an image obtained by the multiband image sensor. The processor generates a depth map based on an image obtained by the multiband image sensor to thereby perform processing of a blurred image.

9 Claims, 17 Drawing Sheets

FIG. 2

| C1 | C5 | C1 | C6 |
|----|----|----|----|
| C3 | C2 | C4 | C2 |
| C1 | C6 | C1 | C5 |
| C4 | C2 | C3 | C2 |

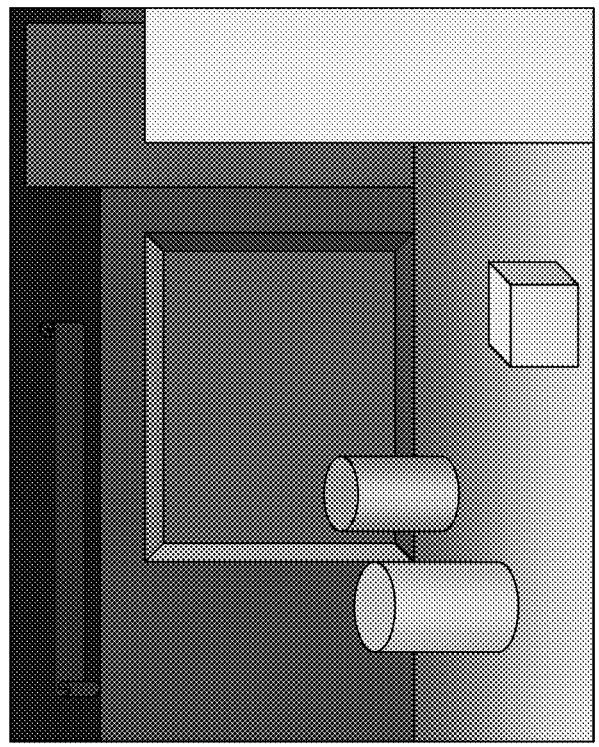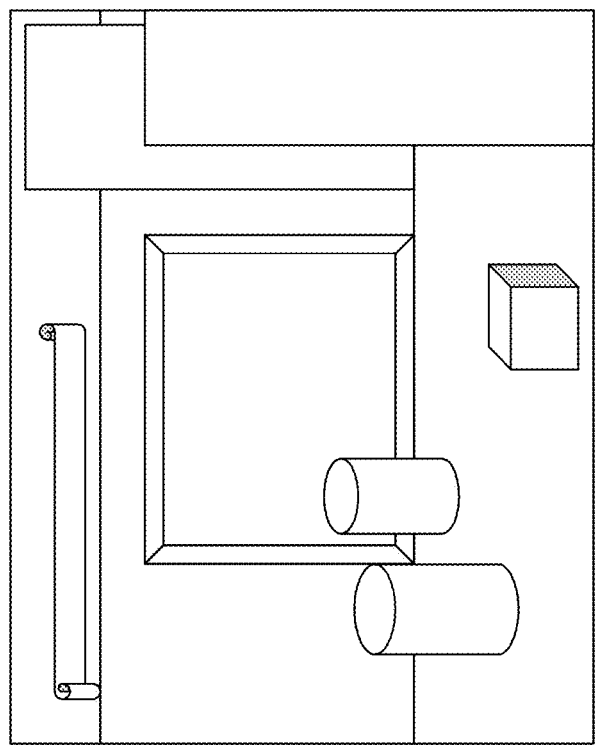
FIG. 8

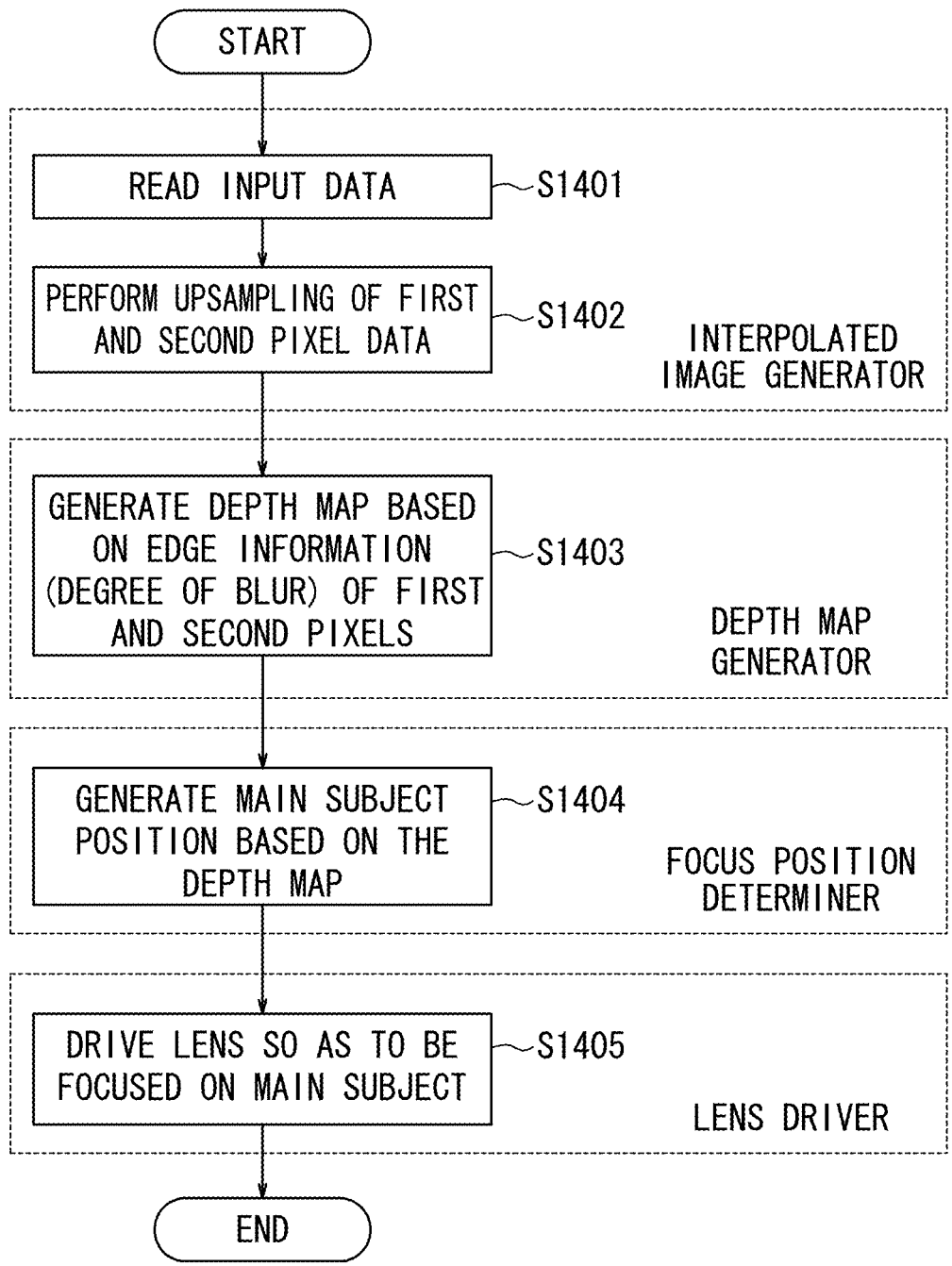

IMAGING APPARATUS

CROSS-REFERENCE TO RELATED APPLICATION

The present application claims priority from Japanese Application No. 2011-234794, filed on Oct. 26, 2011, the content of which is incorporated herein by reference.

TECHNICAL FIELD

The present invention relates to a single-chip multiband image sensor having four or more different spectral sensitivity characteristics, and to an imaging apparatus having a coded aperture.

RELATED ART

There has been known a technology of removing blur, through computation, from a blurred image which is taken with the use of a coded aperture instead of an ordinary circular aperture. The use of this technology makes it possible to perform image processings including processing for generating an all-in-focus image by extending the depth of field after photographing and refocusing processing of changing the focus position. The followings need to be implemented in order to perform the above-mentioned processings.

The photographing needs to be performed using a coded aperture, to thereby increase the optical transfer function of blur.

A depth map needs to be obtained, the depth map being necessary in removing and restoring the blur through computation based on the blur function.

It is difficult to obtain data, in particular, depth map data satisfying these conditions, from a single-shot image, and therefore, there has been disclosed a method of taking a plurality of images of the same subject using different coded apertures or with a plurality of different cameras (see, for example, JP 2008-542863 A).

Further, there is known a method of taking two images at different wavelengths without using a coded aperture, so that the two images have different degrees of blur, to thereby obtain depth map data.

Further, 3-band (RGB) camera is widely used for taking an image of a subject. In recent years, however, for the purpose of performing true color reproduction in an imaging apparatus, there has been proposed a method of acquiring and recording, as an image, further detailed spectral information on the subject by using a multiband imaging apparatus capable of taking an image in four or more bands (see, for example, JP 2003-87806 A).

DISCLOSURE OF THE INVENTION

An imaging apparatus according to a first aspect of the present invention includes:

an image sensor with a light receiving surface which includes two-dimensional arrays of at least three visible light pixels and an infrared pixel, the visible light pixels having sensitivity in different visible light wavelength ranges, the infrared pixel having sensitivity in the infrared wavelength range;

a coded aperture which is disposed on the light receiving surface side of the image sensor and serves as an aperture in a predetermined shape acting on light in one of the wavelength range in which the at least three visible light pixels have sensitivity and the wavelength range in which the infrared pixel has sensitivity, while directly transmitting light in the other wavelength; and a processor for processing an image obtained by the image sensor.

With this configuration, information for two images which are different from each other in degree of blur can be obtained despite that the photographing itself is performed only once, so that a depth map and an all-in-focus image can be generated as described below with respect to the acquired image.

According to a second aspect of the invention, in the imaging apparatus according to the first aspect, the processor has a depth map generator for generating a depth map based on an image obtained by the image sensor.

With this configuration, information for two images which are different from each other in degree of blur can be obtained despite that the photographing itself is performed only once, so that a depth map can be generated based on a single-shot image. This configuration enables blurred image processings such as processing of generating an all-in-focus image by extending the depth of field after photographing and refocusing processing of changing the focus position.

According to a third aspect of the present invention, in the imaging apparatus according to the second aspect, the processor includes:

an interpolated image generator for generating a blurred image of a visible light image obtained through the visible light pixels, by using, as a reference image, an image obtained through the infrared pixel; and a depth of field changed image generator for generating, using the depth map, an image by changing the depth of field of the blurred image, and the coded aperture acts on light in a wavelength range in which the infrared pixel has sensitivity.

With this configuration, the interpolated image generator can generate a blurred image based on a single-shot image, and the depth of field changed image generator can generate an all-in-focus image by using the blurred image and the depth map. Further, the coded aperture does not act on light in the visible light range, and therefore, the visible light pixels can be used for obtaining an image for live-view display that should be obtained through an ordinary aperture.

According to a fourth aspect of the invention, in the imaging apparatus according to the third aspect, the infrared pixel is equal to or higher in pixel density as compared to the at least three visible light pixels.

As a result, the infrared pixel which is high in pixel density increases the accuracy of a reference image retaining the blur obtained through the coded aperture, and hence a blurred image generated for a visible light image based on the reference image can also be improved in accuracy.

According to a fifth aspect of the invention, in the imaging apparatus according to the second or third aspect, the depth map generator generates the depth map by using an image obtained through one visible light pixel of the at least three visible light pixels and an image obtained through the infrared pixel, and the one visible light pixel and the infrared pixel are higher in pixel density than any other pixel of the at least three visible light pixels excluding the one visible light pixel.

With the use of the one visible light pixel that is high in pixel density and the infrared pixel, a depth map to be derived based on image data obtained through these pixels can also be increased in accuracy. Further, the infrared pixel which is high in pixel density increases the accuracy of a reference image retaining the blur obtained through the coded aperture, and hence a blurred image of the visible light image generated based on the reference image can also be improved in accuracy.

According to a sixth aspect of the invention, in the imaging apparatus according to any one of the second to fifth aspects, an imaging lens is driven, based on the depth map generated by the depth map generator, so as to perform focus adjustment.

With this configuration, focus adjustment can be made based on information of the depth map thus obtained. Therefore, the following advantages can be obtained. That is, for example, focusing operation can be performed faster than contrast AF without requiring a dedicated sensor for AF (autofocusing), and a video image can be taken with no shake because the lenses are not driven during the autofocusing.

According to a seventh aspect of the invention, in the imaging apparatus according to the second aspect, the processor includes:
an interpolated image generator for generating, by using, as a reference image, an image obtained through one visible light pixel of the at least three visible light pixels, a blurred image of the visible light image; and
a depth of field changed image generator for generating, using the depth map, an image by changing the depth of field of the blurred image, and
the coded aperture acts on light in a wavelength range in which the at least three visible light pixels have sensitivity.

With this configuration, an interpolated image is generated by using, as a reference image, a blurred image obtained through the coded aperture, to thereby make it possible to generate a multispectral image blurred by the coded aperture. The image is blurred only in the visible light region, and hence an image for generating an all-in-focus image is high in accuracy.

According to an eighth aspect of the invention, in the imaging apparatus according to the second aspect, the processor includes:
an interpolated image generator for generating, by using, as a reference image, an image obtained through one visible light pixel of the at least three visible light pixels, an interpolated image of the visible light image; and
a depth of field changed image generator for generating, by using the depth map, a blurred image by changing the depth of field of the interpolated image, and
the coded aperture acts on light in a wavelength region in which the infrared pixel has sensitivity.

With this configuration, blur can be added to a blur-free interpolated image through simple processing, to thereby make it possible to generate, for example, an image blurred in the background region.

According to a ninth aspect of the invention, in the imaging apparatus according to any one of the first to eighth aspects, the image sensor includes four or more visible light pixels.

With this configuration, a multispectral image can be acquired, so that further detailed spectral information on the subject can be acquired and recorded, to thereby attain an improvement in color reproduction.

According to a tenth aspect of the invention, in the imaging apparatus according to the first of second aspect, the coded aperture is adapted to be capable of switching the wavelength ranges to act on, between the wavelength range in which the infrared pixel has sensitivity and the wavelength ranges in which the at least three visible light pixels have sensitivity With this configuration, the user is capable of selecting, depending on the intended use, which of a blurred image for generating an all-in-focus image, and an ordinary image or a live-view image is prioritized.

BRIEF DESCRIPTION OF THE DRAWINGS

FIG. 2 illustrates an example of a 6-band color filter array on the multiband image sensor of FIG. 1;

FIG. 8 illustrate examples of an actual image and a depth map corresponding to the actual image;

FIG. 17 is a flowchart for illustrating AF operation processing in the fifth embodiment.

BEST MODES FOR CARRYING OUT THE INVENTION

In the following, embodiments of the present invention are described with reference to the drawings.

(First Embodiment)

A first embodiment of the present invention is described by taking, as an example, a case where a depth map is generated from a single-shot image, and a blurred image to be obtained through a coded aperture is generated in a simulated manner, to thereby generate an all-in-focus image.

<Configuration>

Figure 1:
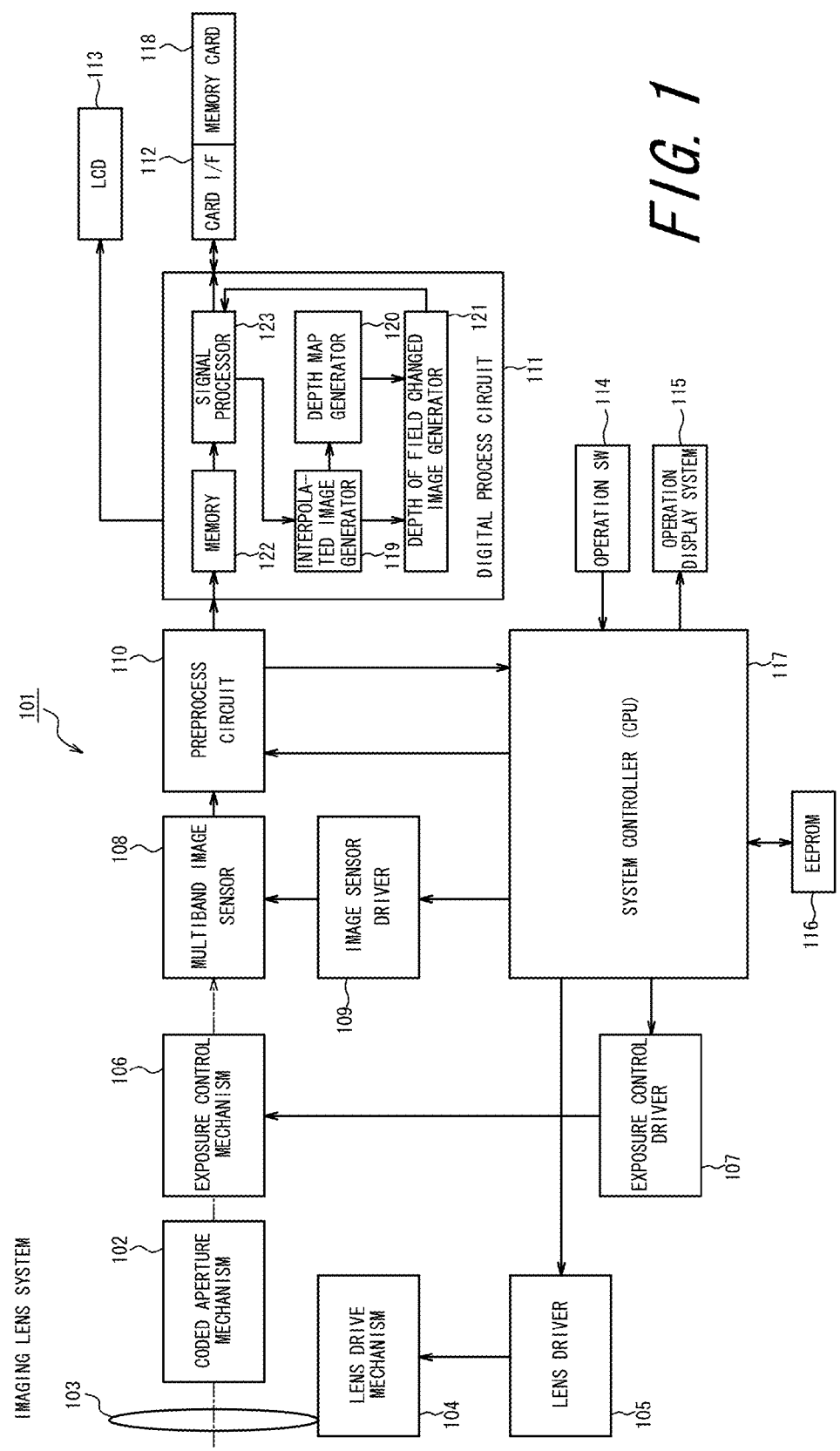
FIG. 1 is a block diagram illustrating a configuration of an imaging apparatus according to a first embodiment of the present invention.

FIG. 1 is a block diagram illustrating a configuration of an imaging apparatus according to the first embodiment of the present invention. The imaging apparatus 101 includes: an imaging lens system 103 which is provided with a coded aperture mechanism 102 and includes various lenses (imaging lenses); a lens drive mechanism 104 for telescopically driving the imaging lens system 103 and driving a zoom lens and a focus lens in the lens system; a lens driver 105 for controlling the lens drive mechanism; an exposure control mechanism 106 for controlling a stop and the inside of a shutter of the lens system; an exposure control driver 107 for controlling the exposure drive control drive mechanism; a multiband image sensor 108 incorporating a color filter having different spectral sensitivity characteristics of four or more bands for subjecting the subject image to photoelectric conversion; an image sensor driver 109 for driving the image sensor; a preprocess circuit 110 including an analog lamp and an A/D converter; a digital process circuit 111 for performing various digital processings such as color signal processing and compression/expansion processing for generating a recording image; a card interface 112 serving to interface with a memory card as an external recording medium; an LCD image display system 113; an operation switch system 114 including various switches such as a release switch and a setting button; an operation display system 115 for displaying an operation state and a mode state; a nonvolatile memory 116 for recording various setting information; and a system controller 117 for performing overall control of each component. Here, the multiband image sensor 108 may be formed of a solid image sensor such as a CCD and a CMOS sensor.

<Operation>

In the imaging apparatus according to this embodiment, the system controller 117 performs entire control over the system, so as to control driving of the lens driver 105, the exposure control driver 107, and the image sensor 108 through the driving of the image sensor driver 109, to thereby perform exposure (charge accumulation) and reading-out of signals. The signals thus read out are subjected to A/D conversion via the preprocess circuit 110 and then taken into the digital process circuit 111. The signals are then subjected to various signal processings in the digital process circuit, before being recorded onto the memory card 118 via the card interface.

In recording multiband image data, color reproduction information is additionally provided thereto as tag information so that it can be referenced when the image is subjected to reproduction processing in a later stage. The color reproduction information may include, for example: the spectral transmittance of the imaging lens; the spectral sensitivity of the image sensor; the spectral-radiance of light (photographing illumination light) used for irradiating the subject at the time of photographing; and statistical information inherent in the subject, the information being referenced when performing processing of estimating the spectral reflectivity of the subject.

The digital process circuit 111 includes, as illustrated in FIG. 1, an interpolated image generator 119, a depth map generator 120, and a depth of field changed image generator 121, as configurations for generating an all-in-focus image data based on a single-shot image, which is a feature of this embodiment. The interpolated image generator 119 performs full-color demosaicing processing on the pixels of RAW data obtained by the image sensor 108 and stored in the memory 122, using, as a reference image, information on pixels (infrared pixels) each having a spectral sensitivity in the infrared region to be described later, to thereby generate, in a simulated manner, a blurred image to be obtained through a coded aperture. The depth map generator 120 generates a depth map using edge information obtained through pixels (visible light pixels) having spectral sensitivity in the visible light region and edge information obtained through pixels having spectral sensitivity in the infrared region. The depth of field changed image generator 121 generates an image which is in focus in all the regions within the image, using the blurred image obtained by the interpolated image generator 119 and the depth map obtained by the depth map generator 120. Then, the image is subjected to various digital processings such as color signal generation processing in the signal processor 123, to thereby generate a final image, which is obtained as the processing result.

Figure 2:
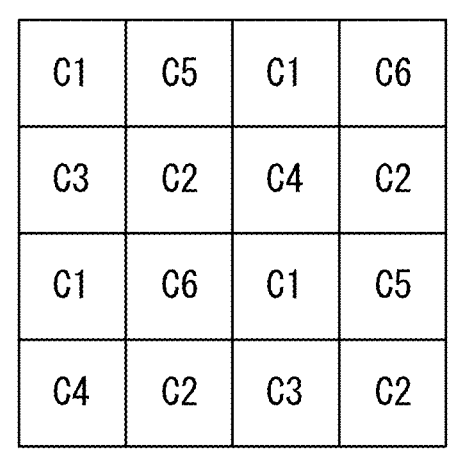

FIG. 2 illustrates, as an example of an array of color filters having different spectral sensitivity characteristics of four or more bands, a color filter array (CFA) having 6-band spectral sensitivity characteristics, the color filters being disposed on light receiving elements forming the multiband image sensor 108. The multiband image sensor 108 has the four-by-four color filter arrays described above, which are two-dimensionally arranged repeatedly in the longitudinal and horizontal directions of FIG. 2, and the color filters C1 to C6 are each correspond one-on-one to the light receiving elements. In this embodiment, the color filters C1 and C2 are arranged at higher density in defense to the spatial resolution of luminance, as compared to the color filters C3 to C6.

Figure 3:
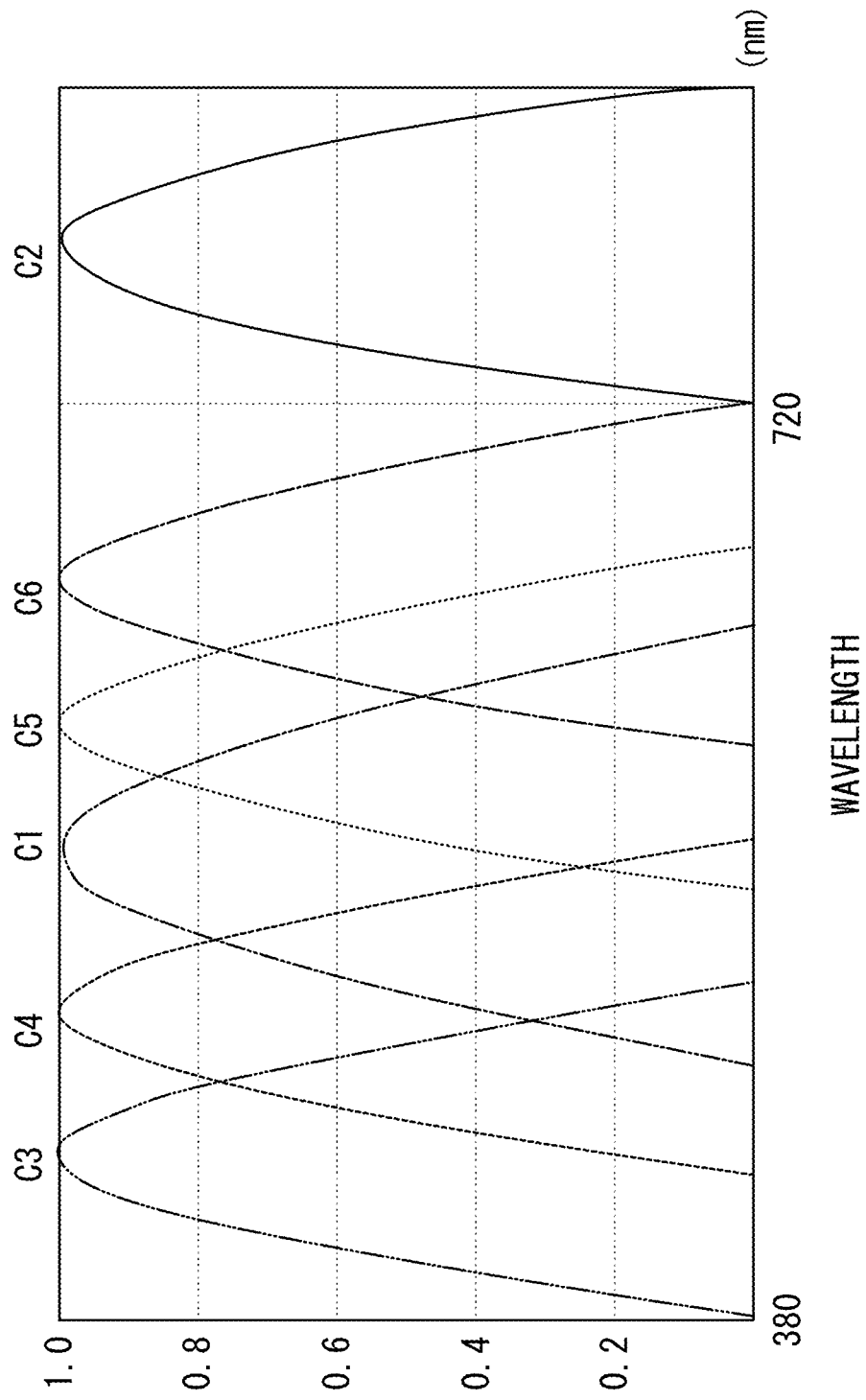
FIG. 3 is a graph showing examples of the spectral sensitivity characteristics of the 6-band color filters of FIG. 2.

Further, FIG. 3 is a graph showing examples of the spectral sensitivity characteristics of the color filters C1 to C6. Although a 3-band image sensor generally uses three colors of RGB, a 4-band image sensor uses an arbitrary color such as Cy (cyan) or Or (orange), in addition to RGB. Further, in this embodiment, the color filter C2 of one color having spectral sensitivity in the infrared region is used so as to allow depth map data to be generated based on a single image. Pixels are formed of the light receiving elements and the color filters C1 to C6 individually disposed on the light receiving elements. Hereinafter, pixels corresponding to the individual color filters C1 to C6 are referred to as first to sixth pixels. Here, the first pixel corresponds to one visible light pixel.

Figure 4:
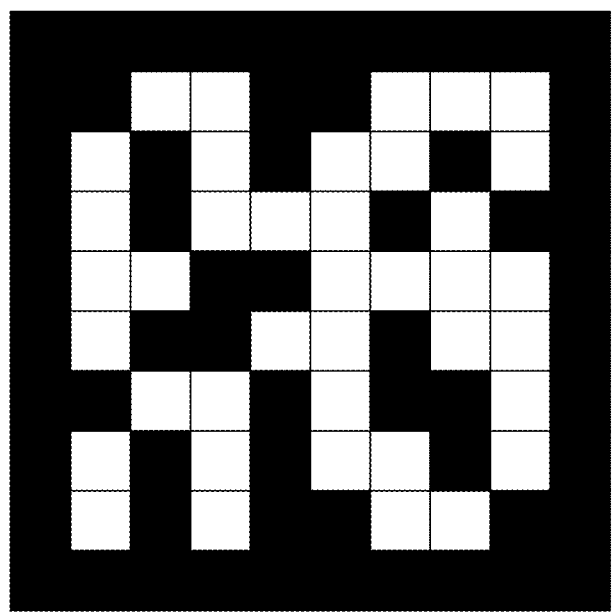
FIG. 4 is a view exemplifying a shape of the coded aperture of FIG. 1.

FIG. 4 illustrates an example of a shape of the coded aperture mechanism 102 in the imaging lens system 103. The black portions of FIG. 4 have infrared-cut characteristics. Accordingly, this shape of the coded aperture is not reflected on light in the visible region, and thus provides data which should be obtained when photographing is performed with an ordinary circular aperture. On the other hand, light in the infrared region reflects the shape of the coded aperture, and provides blurred data.

Here, description is given of the difference between an ordinary circular aperture and a coded aperture, in terms of blur restoration.

In general, a blurred image can be deemed as an image degraded due to a lens optical system including a lens and a stop. This degradation process is represented by a blur kernel h(x,y), an original image f(x,y), and a noise component n(x,y), which are convoluted as follows.

$$g(x,y)=h(x,y)*f(x,y)+n(x,y) \quad (1)$$

Here, the blur kernel h(x,y) is a function determined by the aperture shape, and the noise component n(x,y) is defined in accordance with noise included in the image and may be obtained through observation of noise components in an image to be processed. Alternatively, a noise component obtained in advance based on the ISO speed or the like may be used as the noise component n(x,y).

The Fourier transform can simplify the computation of removing the influence of the convolution on g as a blurred image.

$$G(u,v)=H(u,v) \cdot F(u,v)+N(n,v) \quad (2)$$

Here, G, H, F, and N each are a Fourier transform of g, h, f, and n, respectively. Based on Expression (2), the Fourier transform of a blur-removed estimated original image can be obtained as follows.

$$\hat{F} = \frac{G}{H} = F + \frac{N}{H} \quad (3)$$

$\hat{F}$ may be subjected to inverse Fourier transform, so as to restore a blur-removed image $\hat{f}$. However, in the case of an ordinary circular aperture, the blur kernel h(x,y) becomes similar to the aperture shape, and hence, H becomes 0 or includes a number of extremely small values. As a result, noise is emphasized as shown in the right side of Expression (3), with the result that the solution of the restored image $\hat{F}$ becomes unstable. In this regard, a coded aperture has a function of stabilizing the computation.

Figure 5:
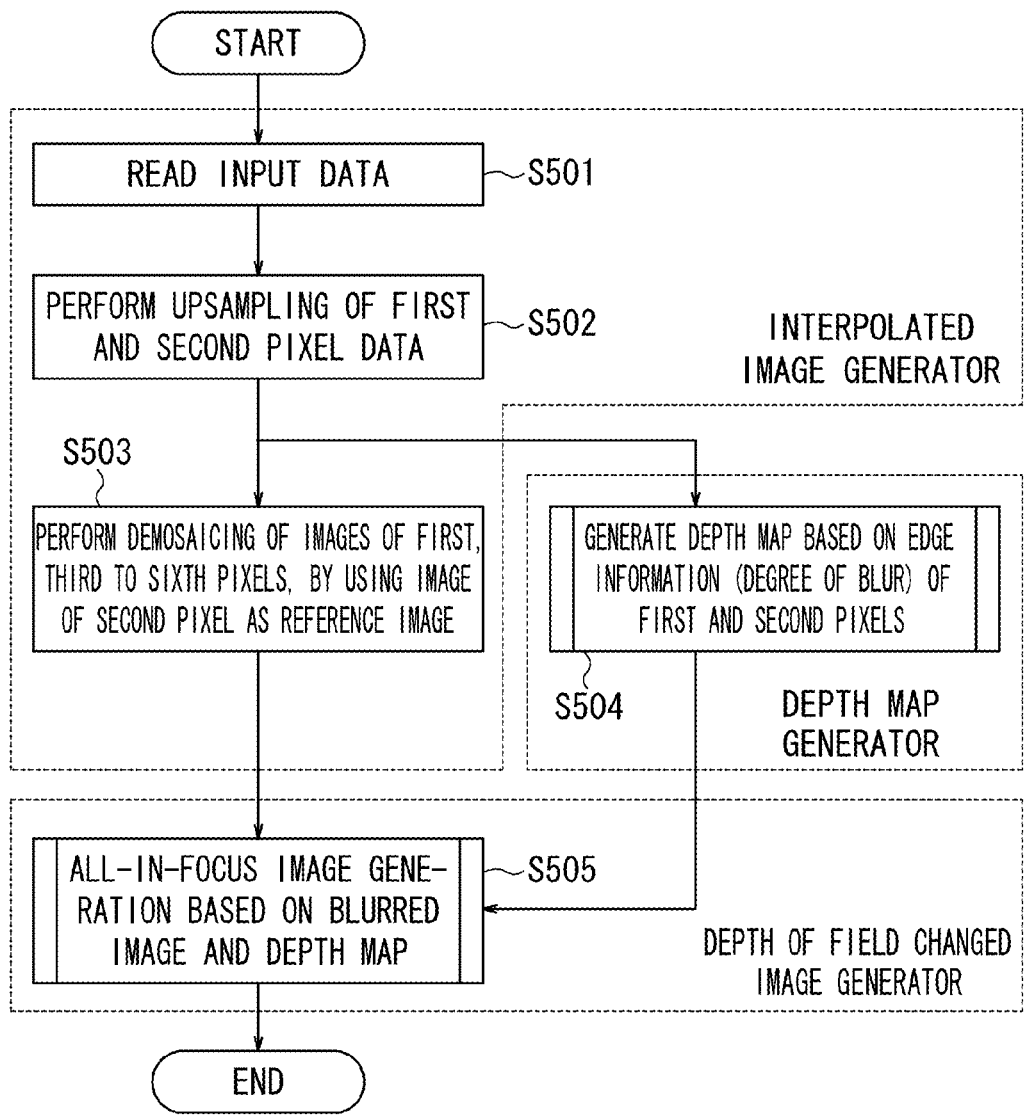
FIG. 5 is a flowchart for illustrating the all-in-focus image generation processing according the first embodiment.

FIG. 5 shows a process flow of the all-in-focus image generation in the digital process circuit. The interpolated image generator 119 reads RAW data obtained by the image sensor 108 (Step S501), and performs upsampling of image data obtained through the first pixel and the second pixel (infrared pixel) corresponding to the high-density color filters C1 and C2, respectively, so as to generate interpolated images (Step S502). Further, with reference to, as a reference image, an interpolated image obtained from the image data of the second pixel which is blurred through a coded aperture, image data obtained through other pixels, namely, the first and third to sixth pixels (visible light pixels) is subjected to demosaicing processing, so as to generate a 5-band full color image (Step S503). This image has been interpolated with reference to the image obtained through the second pixel (infrared pixel), and hence the image retains the same degree of blur as the image obtained through the second pixel (infrared pixel). In other words, a 5-band image blurred by a coded aperture is generated in a simulated manner. On the other hand, a depth map is generated based on the difference in degree of blur between the edge components of the interpolated images generated in Step S502 based on the pixel signals obtained from the first pixel and the second pixel (infrared pixel) (Step S504). Further, based on the 5-band blurred image obtained in Step S503 and the depth map obtained in Step S504, the image is processed so as to be in focus in all the regions within the image, to thereby generate an all-in-focus image (Step S505).

Next, the method of generating an interpolated image of Step S502 is described. As an existing interpolation method, Gaussian interpolation (GI) is widely known, which is a method of estimating a pixel value as a weighted mean weighted by local information in the vicinity of the position of a pixel targeted for estimation of a pixel value. The estimated solutions obtained for the pixel position $X_p$ are each represented as follows.

$$S^{GI}(x_p) = \frac{1}{\varpi_{x_p}^{GI}} \sum_{x_i \in N_{x_p}} k(x_i - x_p) M(x_i) S(x_i) \quad (4)$$

In Expression (4), $N_{x_p}$ is a set of pixel positions of surrounding pixels of the pixel position $x_p$, $S(x_i)$ represents a sample value of the pixel position $x_i$, $M(x_i)$ represents a binary mask of the pixel position $x_i$, $k(x_i-x_p)$ represents a weight based on a distance from the pixel position $x_p$, and $\omega$ represents a normalized coefficient, namely, a sum of the weight. The binary mask has a value of 1 at a position where a sample value exists, and otherwise has a value of 0.

In this embodiment, image data obtained through the first pixel and the second pixel (infrared pixel) is subjected to the above-mentioned Gaussian process interpolation (GI), to thereby generate interpolated images each having information of the first pixel and second pixel (infrared pixel) at all the pixel positions.

Although the above-mentioned description is made based on GI for the sake of simplicity, the present invention is not limited thereto, and may employ, for example, interpolation based on differential information on the pixel values.

Next, the interpolated image generation using a reference image of Step S503 is described. A guided filter is known as an existing interpolation method using a reference image. Here, the reference image is a high-resolution image having an image structure corresponding to a low-resolution image to be interpolated. The guided filter is based on the idea that an output image is represented by a linearly-converted reference image, and employs a least square method so as to minimize a cost coefficient E of a local region in the vicinity of a pixel Xp which is targeted for estimation of the pixel value, to thereby derive a coefficient $(a_{X_p}, b_{X_p})$.

$$E(a_k, b_k) = \frac{1}{\varpi_k} \sum_i M_i((a_k I_i + b_k - p_i)^2 + \varepsilon a_k^2) \quad (5)$$

In Expression (5), $\omega_k$ is a number of elements in signal components present in the vicinity of the target pixel, $M_i$ represents a binary mask, and $a_k, b_k$ are parameters to be derived, which are assigned appropriate initial values at the start of computation. $I_i$ represents pixel values of the reference image corresponding to the surrounding pixels, $p_i$ represents a pixel value of the signal component, and $\varepsilon$ represents a predetermined smoothing parameter. When the coefficient $(a_k, b_k)$ is derived for all the pixels, an output pixel value is derived based on Expression (6) for each pixel that does not have an intended signal component.

$$q_i = \frac{1}{|\omega|} \sum_{k:i \in \omega_k} a_k I_i + b_k \quad (6)$$

In this embodiment, an interpolated image based on the image data obtained through the second pixel (infrared pixel) in Step S502 is used as a reference image, and image data obtained through the first and third to sixth pixels (visible light pixels) is used as an image to be interpolated, to thereby perform interpolation processing. Interpolation is thus performed using a reference image, to thereby make it possible to generate an interpolated image retaining the same degree of blur as the reference image.

The reference images in the above-mentioned description are all described as the interpolated image based on the image data obtained through the second pixel (infrared pixel). However, interpolation processing of image data may also be performed by switching the reference images, using the correlation of the spectral sensitivity characteristics, so that image data obtained through the first pixel may be first interpolated, then image data obtained through the fourth and fifth pixels is interpolated using, as a reference image, the interpolated image of the image data obtained through the first pixel, image data through the third pixel may be interpolated using, as a reference image, the interpolated image of the image data of the fourth pixel, and image data from the sixth pixel may be interpolated using, as a reference image, the interpolated image of the image data of the fifth pixel.

Figure 6:
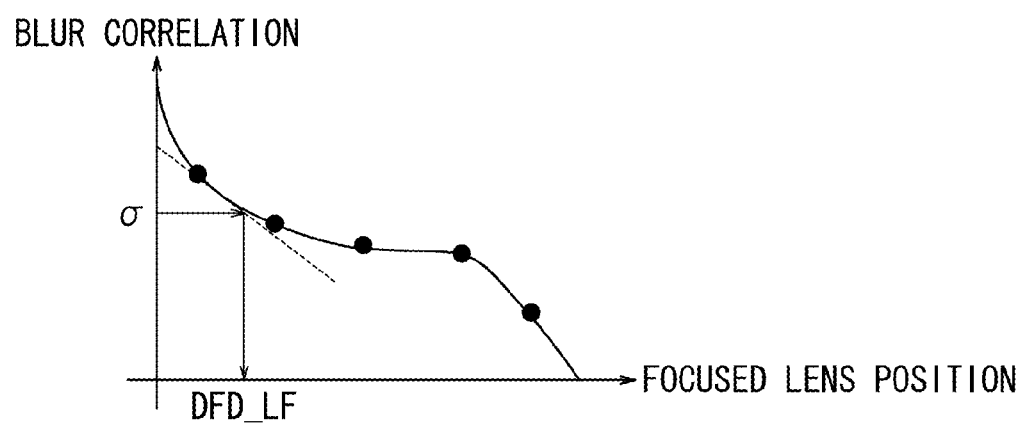
FIG. 6 is a graph showing a relation between the blur correlation σ and the in-focus focus lens position in the DFD method.

Next, the depth map generation based on two images that are different from each other in degree of blur of Step S504 is described. There has been proposed Depth from Defocus (DFD) method, in which, based on two images that are different from each other in blur status, a blur correlation σ serving as a parameter indicating a correlation of blur between the data items of these two images is derived for each predetermined pixel, and the derived blur correlation σ is compared to a predetermined table, to thereby perform distance measurement in the target pixel. The blur correlation herein refers to a value having a correlation with a dispersion of the point spread function (PSF) of the optical system. The PSF is a function indicating a degree of spreading of light beams in the case where an ideal point image has passed through the optical system. Further, the predetermined table may be a look-up table showing, as illustrated in FIG. 6, the correspondence between the blur correlation σ and the in-focus focus lens position DFD_LF, and the table is created in advance based on design data.

In this embodiment, despite that only a single image is taken, a visible light pixel, in particular, the first pixel corresponding to the color filter C1 provides image data to be obtained through a circular aperture, while the second pixel (infrared pixel) corresponding to the second color filter C2 provides image data to be obtained through a coded aperture, so that photographing information for two images that are different from each other in degree of blur can be obtained, which allows a depth map to be generated by DFD method.

Figure 7:
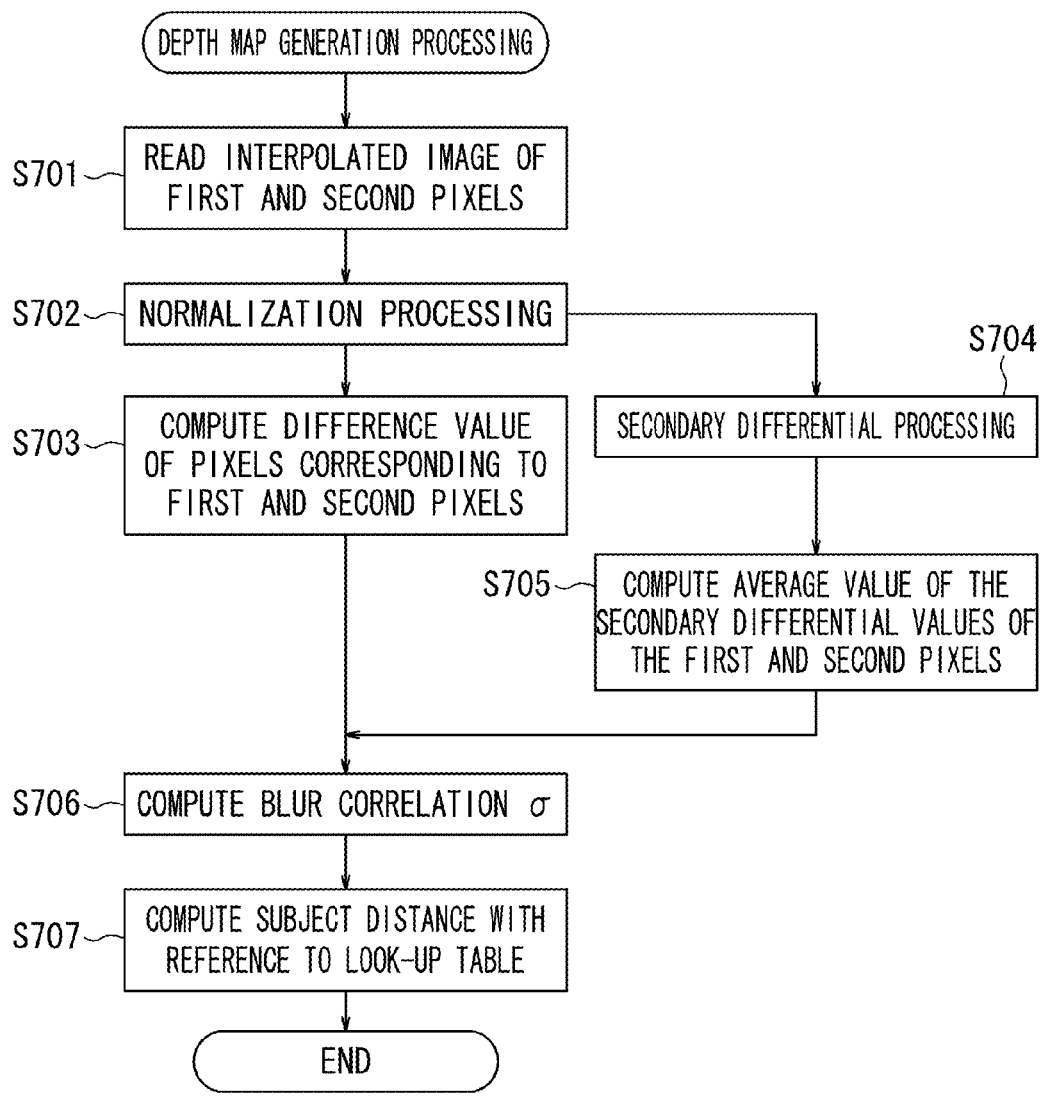
FIG. 7 is a flowchart for illustrating the depth map generation processing of FIG. 5.

FIG. 7 is a flowchart for illustrating the depth map generation processing in the depth map generator 120. Interpolated images for the first and second pixels are read (Step S701), and the images are subjected to normalization processing such as lowpass filter processing for removing electric noise, image magnification correction processing, and luminance distribution correction processing (Step S702). Then, the difference in luminance information between pixels corresponding to each other in the image data items on these two images is derived (Step S703). Further, the image data items on these two images are subjected to secondary differential processing (Step S704). Then, an average value between the secondary differential processing result on the image data for the first pixel and the secondary differential processing result on the image data for the second pixel (infrared pixel) is derived (Step S705).

After that, the difference derived for luminance distribution in Step S703 is divided by the average value between the secondary differential processing results obtained in Step S705, so as to obtain the blur correlation σ having a correlation with the dispersion of PSF (Step S706). The blur correlation σ and the subject distance render a linear relation relative to the inverse of the subject distance. Then, the blur correlation σ obtained in Step S706 is compared to the look-up table, to thereby derive a subject distance in the target pixel (Step S707).

FIG. 8 show examples of an actual image and a depth map corresponding to the actual image. FIG. 8(a) illustrates an actual image, and FIG. 8(b) is a depth map corresponding to FIG. 8(a). The depth map shows a distance to a subject by using, for example, luminance. In FIG. 8(b), a distance to a subject is shorter when the color of an image corresponding to the subject is whiter.

Here, the subject distance and the in-focus position of the focus lens correspond to each other one-on-one, and hence, when the relation between the blur correlation and the in-focus position of the focus lens can be obtained one-one-one as shown in FIG. 6, the subject distance corresponding thereto can be obtained as a matter of course.

Further, the look-up table is stored in advance in the depth map generator 120. The look-up table includes in-focus focus lens positions that can be referenced relative to the blur correlation σ derived with respect to an arbitrary subject. However, when the look-up table does not include the corresponding blur correlation σ, the corresponding in-focus focus lens position is derived through interpolation computation.

Although the above-mentioned description is made, for the sake of simplicity, assuming that the computation is independently performed for each pixel, the present invention is not limited thereto, and the subject distance may be obtained for a pixel region including information on the neighboring pixels of the target pixel for the purpose of stabilizing accuracy in distance measurement.

Figure 9:
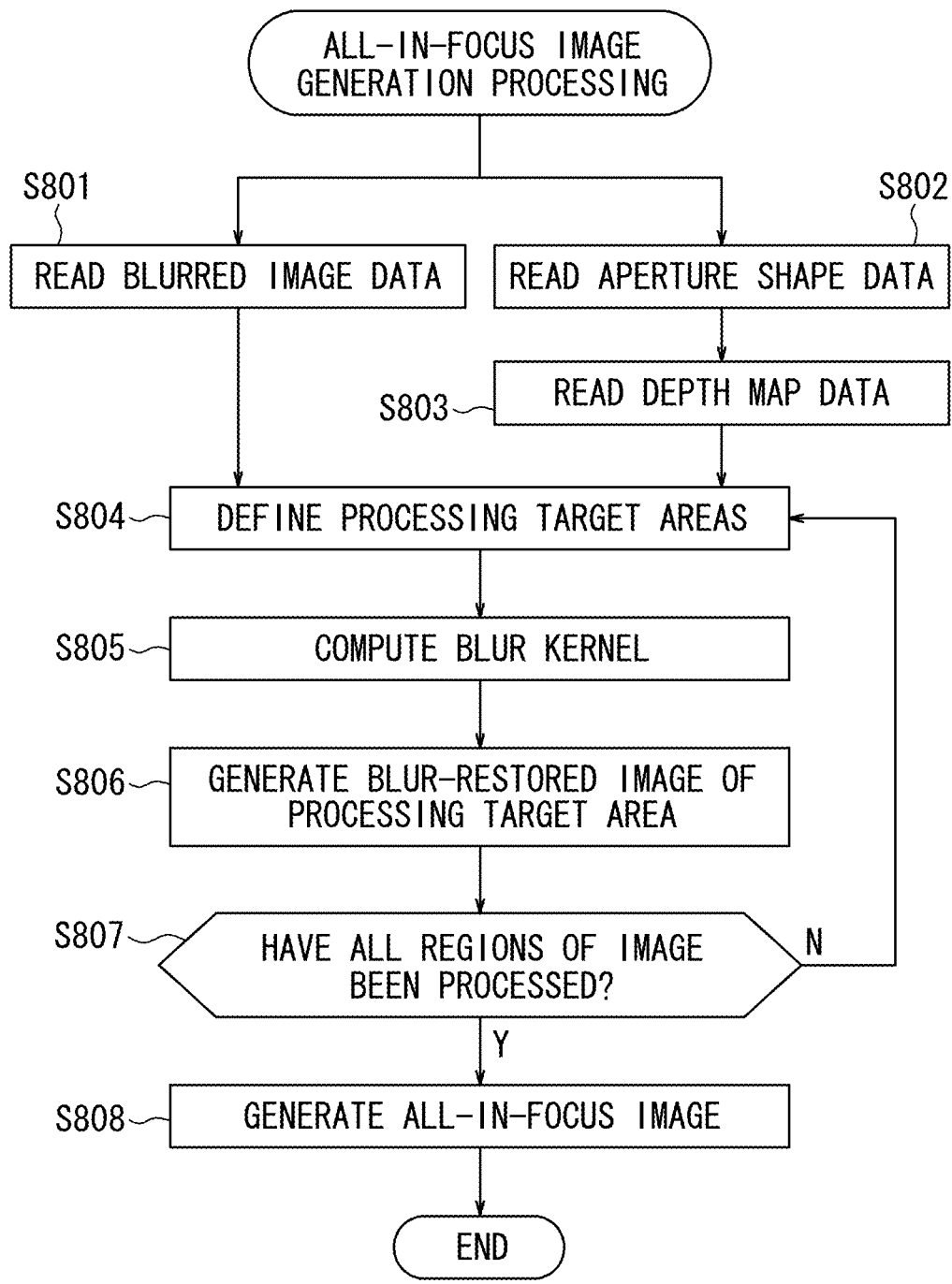
FIG. 9 is a flowchart for illustrating the all-in-focus image generation processing of FIG. 5.

Next, the all-in-focus image generation processing of Step S505 is described. FIG. 9 is a flowchart illustrating a process flow of the all-in-focus image generation in the depth of field changed image generator 121. A blurred image obtained for all colors obtained by the interpolated image generator 119 is read (Step S801), and an aperture shape data obtained in advance is read (Step S802). The data is read in the form of Fourier transform A with respect to the aperture shape (x,y) so that it can be used for the processing at a later stage. Further, the depth map data obtained by the depth map generator 120 is read (Step S803). For blur restoration, the processing target area needs to be uniform in depth, and hence, the image is divided into smaller processing target areas and subjected to the processing (Step S804). Then, a blur kernel is derived for each processing target area, using the aperture shape data and the depth map data (Step S805). The blur kernel h(x,y) is similar in geometry to the aperture shape as described above, and can be represented by Expression (7).

$$h(x, y) = \frac{1}{M^2} a\left(\frac{x}{M}, \frac{y}{M}\right) \tag{7}$$

In Expression (7), a(x,y) represents the aperture shape, and M represents multiples of h(x,y) relative to a(x,y), which varies depending on the distance from the lens to the subject. The term $$\frac{1}{M^2}$$

indicates that the transmission of the lens is constant irrespective of the size of blur. The Fourier transform of Expression (7) is represented by Expression (8).

$$H(\bar{\omega}_x, \bar{\omega}_y) = A(M\bar{\omega}_x, M\bar{\omega}_y) \tag{8}$$

In Expression (8), ω_x, ω_y are spatial frequencies. As described above, the Fourier transform H of the blur kernel can be obtained based on an aperture shape and a depth map. F̂ is obtained using Expression (3) for the blur kernel in the processing target area and the blurred image thus obtained, which is then subjected to inverse Fourier transform, to thereby generate a blur-restored image (Step S806). This processing is performed on the entire image (Step S807), and the processing results are integrated, to thereby generate an all-in-focus image which is in focus in all the regions (Step S808).

This processing may also be performed as follows. That is, an image is divided into smaller regions overlapping each other and processed, and the processing results may be integrated for the entire image as being weighted in such a manner that the weight is increased as it gets closer to the center of each region.

Figure 10:
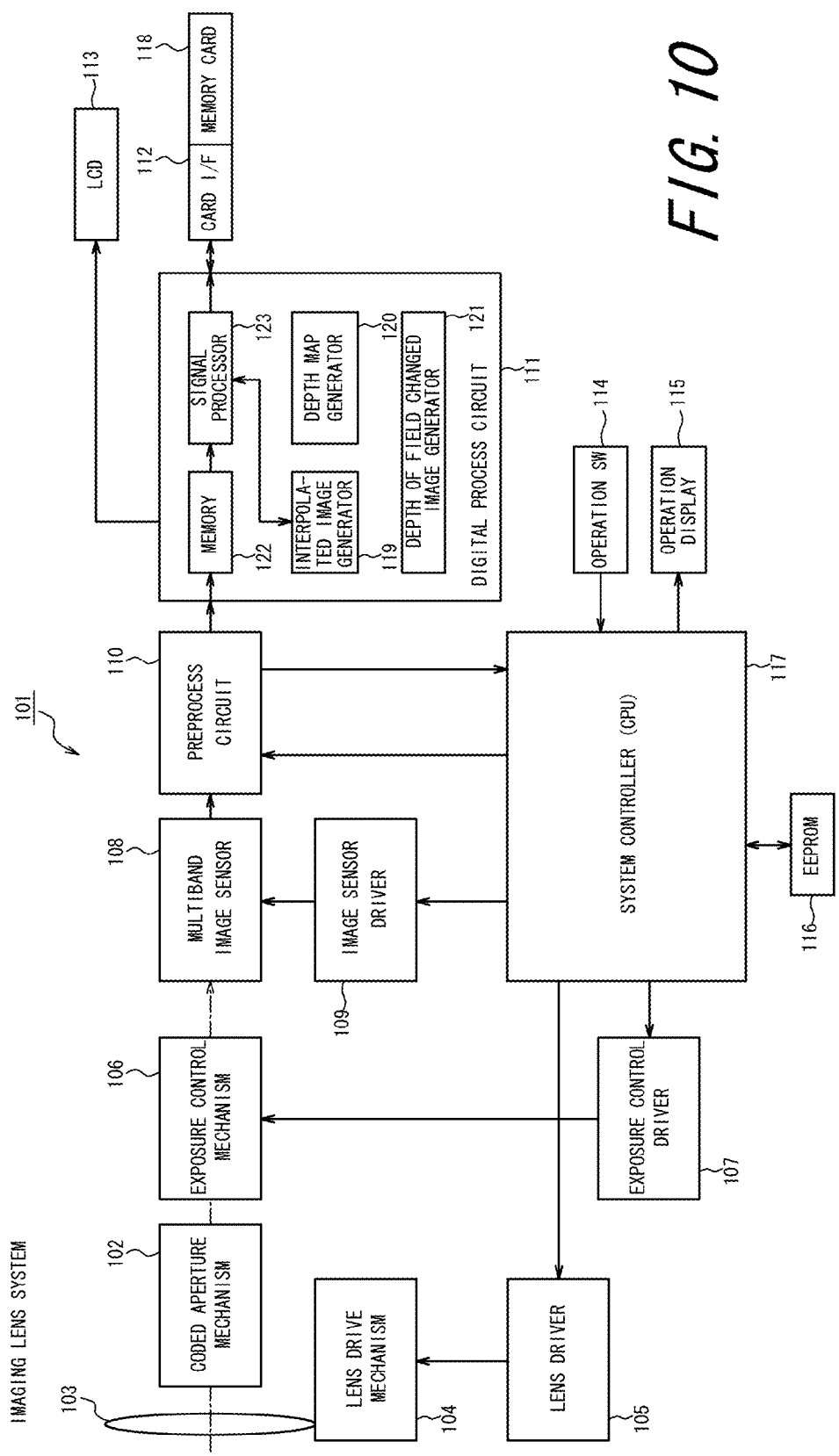
FIG. 10 is a diagram for illustrating processing to be performed when the imaging apparatus of FIG. 1 performs ordinary photographing or live-view display.

Next, description is given of a case of generating an ordinary image, which is not for blur restoration, by using the imaging apparatus 101. In generating an ordinary image, different processing is performed in the digital process circuit 111 as illustrated in FIG. 10. When displaying an ordinary image, the image is generated using only the information of the first and third to sixth pixels each having spectral sensitivity in the visible light region, without using any blur information obtained with the coded aperture 102.

First, the RAW data obtained by the image sensor 108 is sampled and read out, and image data obtained through the high-density first pixels is subjected to upsampling, to thereby generate an interpolated image. With reference to, as a reference image, the interpolated image obtained through the first pixels, image data obtained through other pixels, namely, the third to sixth pixels, is subjected to demosaicing processing, so as to generate a 5-band full color image. Unlike in the case of using, as a reference image, the interpolated image obtained based on image data of the second pixels (infrared pixels), the interpolated image of the first pixels is a blur-free image obtained through an ordinary aperture. With the use of the blur-fee image as a reference image, the interpolated image for the third to sixth pixels is also generated as a blur-free image. After that, the image is subjected to various processings such as color conversion processing and compression processings in the signal processor 123, so as to generate an output image.

Next, image generation for live-view display is described. In performing live-view display, the image is generated using only the information of the first and third to sixth pixels each having spectral sensitivity in the visible light region without using any blur information obtained with the coded aperture 102, as in the case of generating an ordinary image. For the purpose of increasing the processing speed, the RAW data obtained by the image sensor 108 is sampled and read out, and an interpolated image is generated as in the case of generating an ordinary image. When the LCD 113 is a multi-primary color monitor, the interpolated image is subjected to various processings such as noise reduction in the signal processor 123, and then subjected to color conversion processing. The color conversion processing is performed based on monitor profile information on the multi-primary color monitor which is acquired in advance and information on the illuminating light under the observation environment which is obtained by an illumination spectrum distribution information sensor (not shown), so that the subject is reproduced in the tone of color as if the subject is irradiated with illumination used for observing the multi-primary color monitor, which allows an observer observing the multi-primary color monitor to observe a reproduced image with increased reality.

Further, when the LCD 113 is an RGB monitor, the color conversion processing is performed so that multiband image data is converted into RGB image data, and color/gamma processing is performed. The color/gamma processing is performed based on the profile information on the RGB monitor which has been acquired in advance.

As described above, according to this embodiment, the coded aperture functions as an aperture in a predetermined shape with respect to light in a wavelength range in which the second pixel (infrared pixel) has sensitivity, while directly transmitting light in a wavelength range in which a visible light pixel has sensitivity. Accordingly, information for two images that are different from each other in degree of blur can be obtained based on a single-shot image, which makes it possible to generate a depth map. In this manner, a multi-spectrum all-in-focus image can be obtained based on a single-shot image, particularly in a case where the subject is moving, a case where only limited time can be spared for photographing, and a case of taking a video image. Further, there can be performed live-view display of a multi-spectrum image while acquiring all-in-focus image data at the same time.

Figure 11:
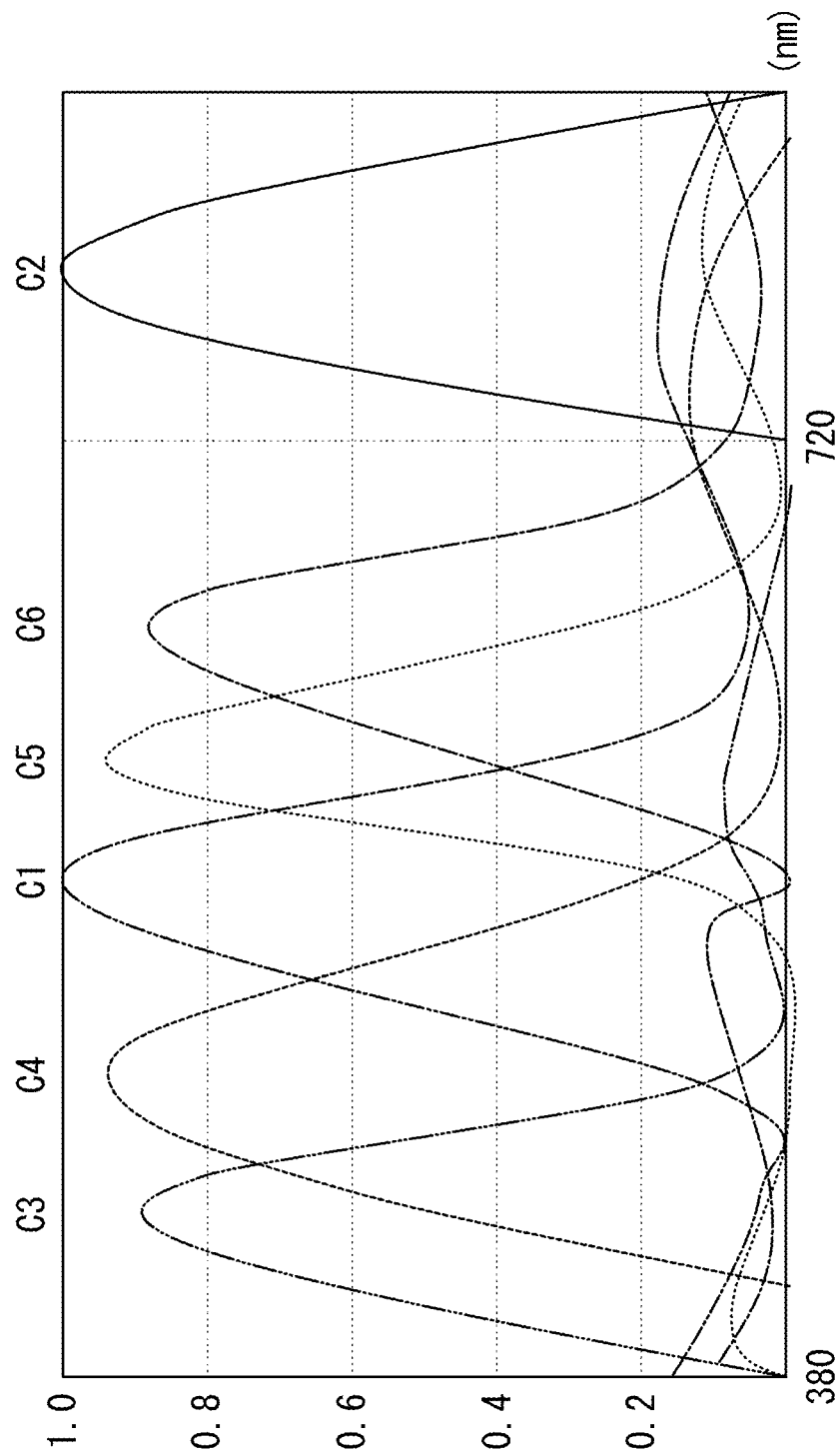
FIG. 11 is a graph showing an example of the spectral sensitivity characteristics of the 6-band color filters in reality.

This embodiment employs color filters having spectral sensitivity characteristics of FIG. 3. However, when the color filters are used in reality, the color filters transmitting light in the visible range also transmit part of light in the infrared region as shown in FIG. 11. In view of this, an IR-cut filter for cutting off infrared light may be desirably provided on the pixels in addition to the color filters C1, C3 to C6, except for the second pixels (infrared pixel) corresponding to the color filter C2.

Further, in this embodiment, an all-in-focus image is generated. However, it is needless to say that a re-focus image may also be generated by processing an image so as to be in focus only at an arbitrary distance while adding blur to the rest of the regions that belong to other distances, the blur being added based on the difference in distance from the in-focus region, to thereby arbitrarily change the focus position.

(Second Embodiment)

Figure 12:
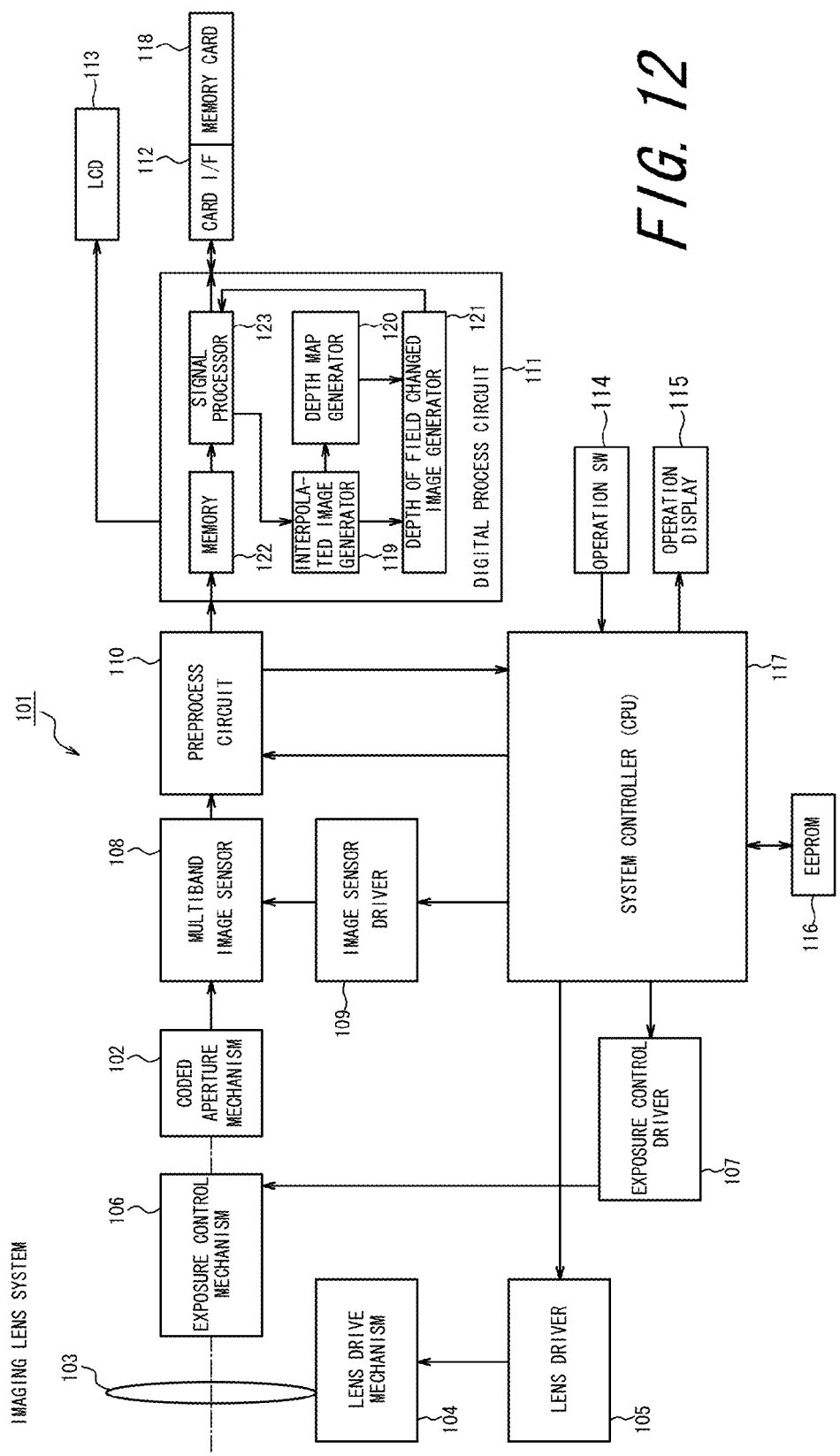
FIG. 12 is a block diagram illustrating a configuration of an imaging apparatus according to a second embodiment of the present invention.

FIG. 12 is a block diagram illustrating a configuration of an imaging apparatus according to a second embodiment of the present invention. The second embodiment is different from the first embodiment in that the coded aperture mechanism 102, which is mounted to the imaging lens system 103 in the first embodiment, is disposed in front of the image sensor 108 of the imaging apparatus. Alternatively, only the coded aperture may be independently provided as an external optional mechanism. Further, a filter that can be electrically changed in transmission wavelength range, such as a liquid crystal tunable filter, may be used to control the coded aperture. Other configurations are similar to those of the first embodiment. Accordingly, the same constituent elements are denoted by the same reference symbols and description thereof is omitted.

With the above-mentioned configuration, the effect of the present invention can still be obtained even without using a particular lens mounted with the coded aperture mechanism 102. Further, according to the first embodiment, the coded aperture mechanism 102 is mounted to the lens 103, which makes it difficult to change the wavelength range to which the coded aperture is to be applied. In contrast, according to this embodiment, a filter that can be electrically changed in wavelength range is used to control the coded aperture, so that a coded aperture acting only on the infrared wavelength region and a coded aperture acting only on the visible light region can be selectively used depending on the intended use.

(Third Embodiment)

Figure 13:
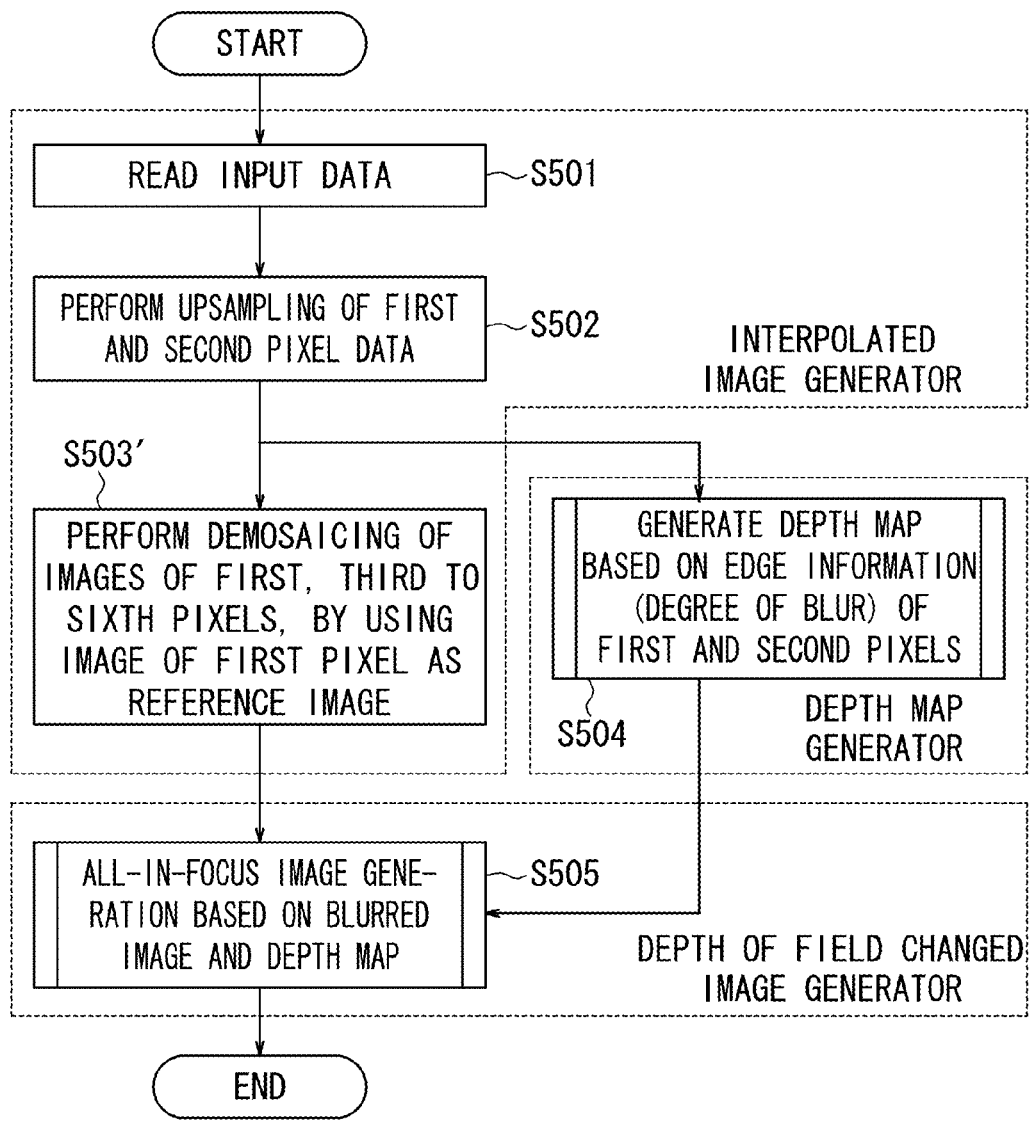
FIG. 13 is a flowchart for illustrating an all-in-focus image generation processing according to a third embodiment of the present invention.

FIG. 13 is a flowchart for illustrating all-in-focus image generation processing according to a third embodiment of the present invention. The first embodiment employs a coded aperture acting only on the infrared wavelength region, whereas this embodiment employs a coded aperture acting only on the visible light region. Other configurations are similar to those of the first embodiment. In this embodiment, the first and third to sixth pixels which are sensitive in the visible light region provide a blurred image to be obtained through a coded aperture while the second pixel (infrared pixel) that is sensitive in the infrared region provides an image to be obtained through an ordinary aperture. Accordingly, in the all-in-focus image generation processing, the interpolated image generator 119 performs, in Step S503' instead of Step S503 of the first embodiment, demosaicing processing on image data obtained through the first and third to sixth pixels (visible light pixels), with reference to, as a reference image, an interpolated image based on the image data of the first pixel blurred by the coded aperture. Other processings are similar to those of the first embodiment.

According to this embodiment, images obtained through the first and third to sixth pixels (visible light pixels) are blurred in advance, and hence, a blurred image generated using these images is increased in accuracy, which allows accurate refocus processing to be performed. On the other hand, this embodiment is not suited to generation of an ordinary image and a live-view display image because the images are generated using an interpolated image based on image data from the second pixel (infrared pixel) and therefore reduced in accuracy. The all-in-focus image generation processing may also be applied to the configuration of the second embodiment.

(Fourth Embodiment)

Description is given of a fourth embodiment, in which a depth map is generated based on a single-shot image, and the image is appropriately blurred with reference to the depth map information, to thereby generate an image which is changed in depth of field in a simplified manner. The imaging apparatus 101 of this embodiment is similar in configuration to that of the first embodiment, except in that the processing performed in the digital process circuit 111 is different from that of the first embodiment. Specifically, the processing in the interpolated image generator 119 and the processing in the depth of field changed image generator 121 are different from those of the first embodiment.

The interpolated image generator 119 generates a full-color interpolated image in the visible light region with respect to image data obtained through the pixels of RAW data obtained by the image sensor 108 and stored in the memory 122, with reference to, as a reference image, an interpolated image obtained through the first pixel, without using any information on an image blurred by the coded aperture 102, as in the processing performed in generating an ordinary image in the first embodiment. As a result, an ordinary image without reflecting the aperture information on the coded aperture 102 can be generated.

The depth map generator 120 generates a depth map as in the first embodiment.

The depth of field changed image generator 121 additionally provides blur information to an arbitrary region located at a distance different from the subject, using the ordinary image obtained by the interpolated image generator 119 and the depth map obtained by the depth map generator 120. As a result, there can be obtained an image which is reduced in depth of field in a simulated manner. Then, the image is subjected to various digital processings such as color signal generation processing in the signal processor 123, to thereby generate a final image, which is obtained as the processing result.

Figure 14:
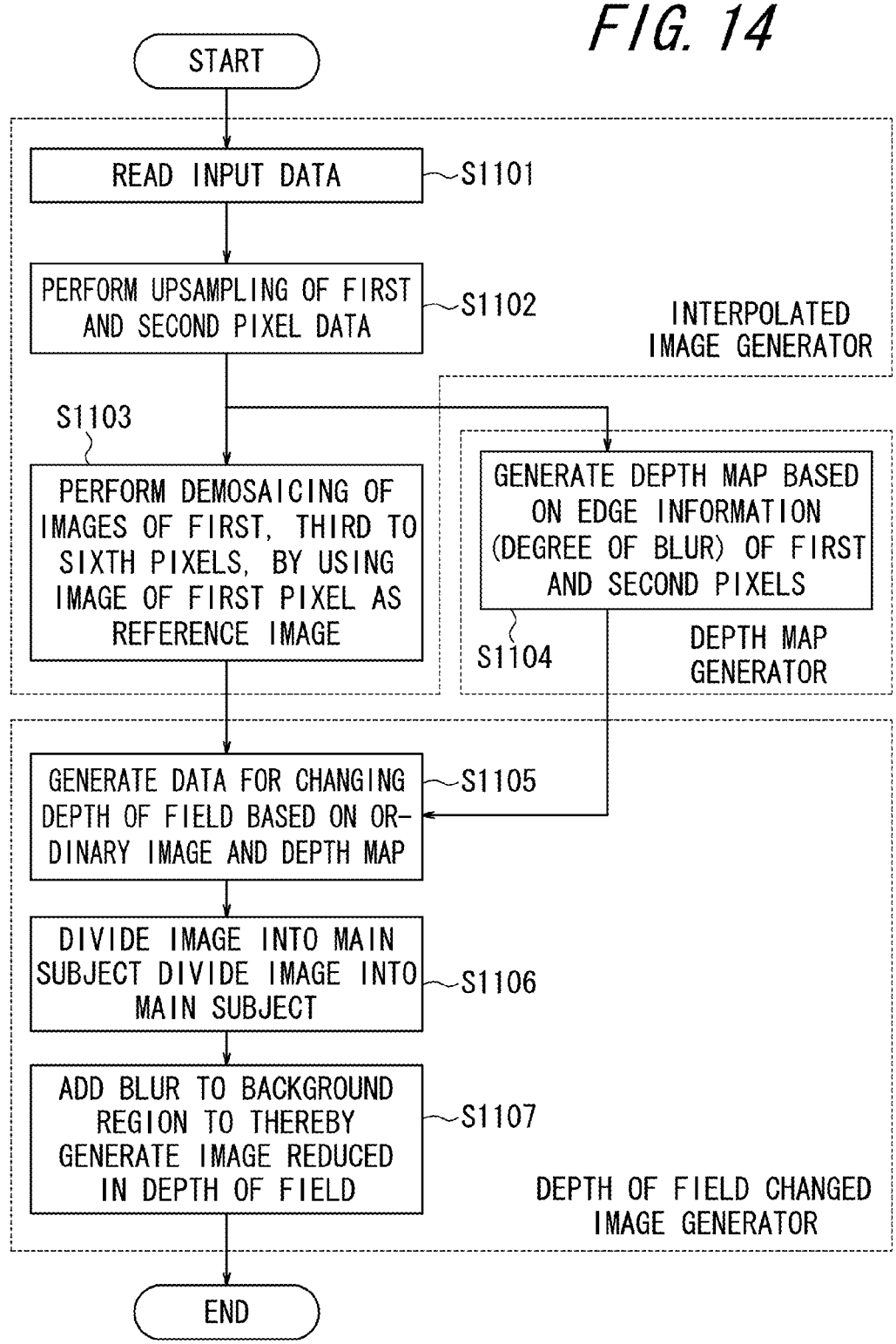
FIG. 14 is a flowchart for illustrating a depth of field changed image generation processing according to a fourth embodiment of the present invention.

FIG. 14 is a flowchart for illustrating the above-mentioned process of changing the depth of field of an image. First, the interpolated image generator 119 reads RAW data obtained by the multiband image sensor 108 (Step S1101), and performs upsampling of image data obtained through the high-density first pixel and second pixel (infrared pixel), so as to generate interpolated images (Step S1102). With reference to an interpolated image of the first pixel obtained through an ordinary aperture without being affected by a coded aperture, images of the first and third to sixth pixels are subjected to demosaicing processing, so as to generate 5-band full color image (Step S1103).

On the other hand, the depth map generator 120 generates a depth map based on the degree of blur of an edge component of an interpolated image of the first pixel and the second pixel (infrared pixel) generated in Step S1102 (Step S1104).

Figure 15:
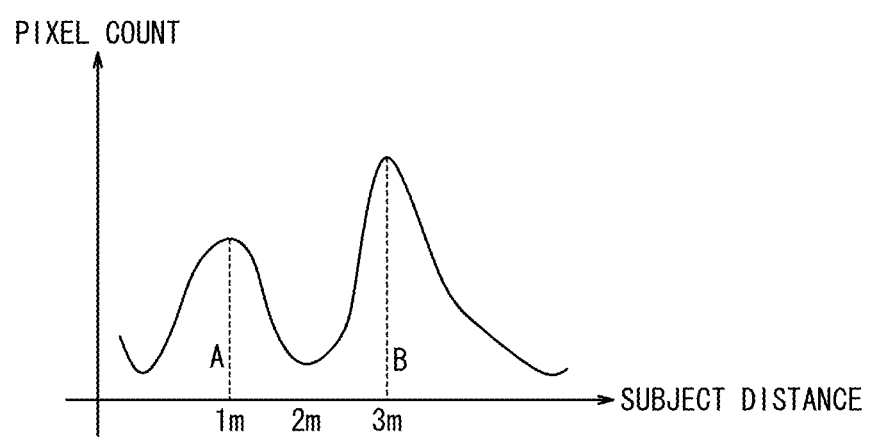
FIG. 15 is an example of a histogram showing a relation between the subject distance and the pixel count.

Further, the depth of field changed image generator 121 generates data for changing the depth of field, based on the 5-band ordinary image obtained in Step S1103 and the depth map obtained in Step S1104 (Step S1105). Next, based on the information of the depth map, the image region is divided into a main subject region and a background region (Step S1106). For example, a histogram showing a relation between the subject distance and the pixel count as shown in FIG. 15 may be obtained based on the depth map, so as to assume that a main subject can be found at a distance where the pixel count becomes maximum, to thereby obtain the main subject region. Then, arbitrary blur may be added to a region located at a distance different from the distance of the main subject, to thereby generate an image which is reduced in depth of field in a simulated manner (Step S1107).

The blur added in Step S1107 may be, for example, Gaussian blur, which is different from the blur obtained through the coded aperture in the first embodiment, but an image blurred in the background region can be generated through simple processing. However, unlike in the first embodiment, blur can only be added, and there is obtained no effect of removing the blur.

(Fifth Embodiment)

Description is given of a fifth embodiment in which a depth map is generated based on a single-shot image, which is applied to autofocus (AF) processing.

Figure 16:
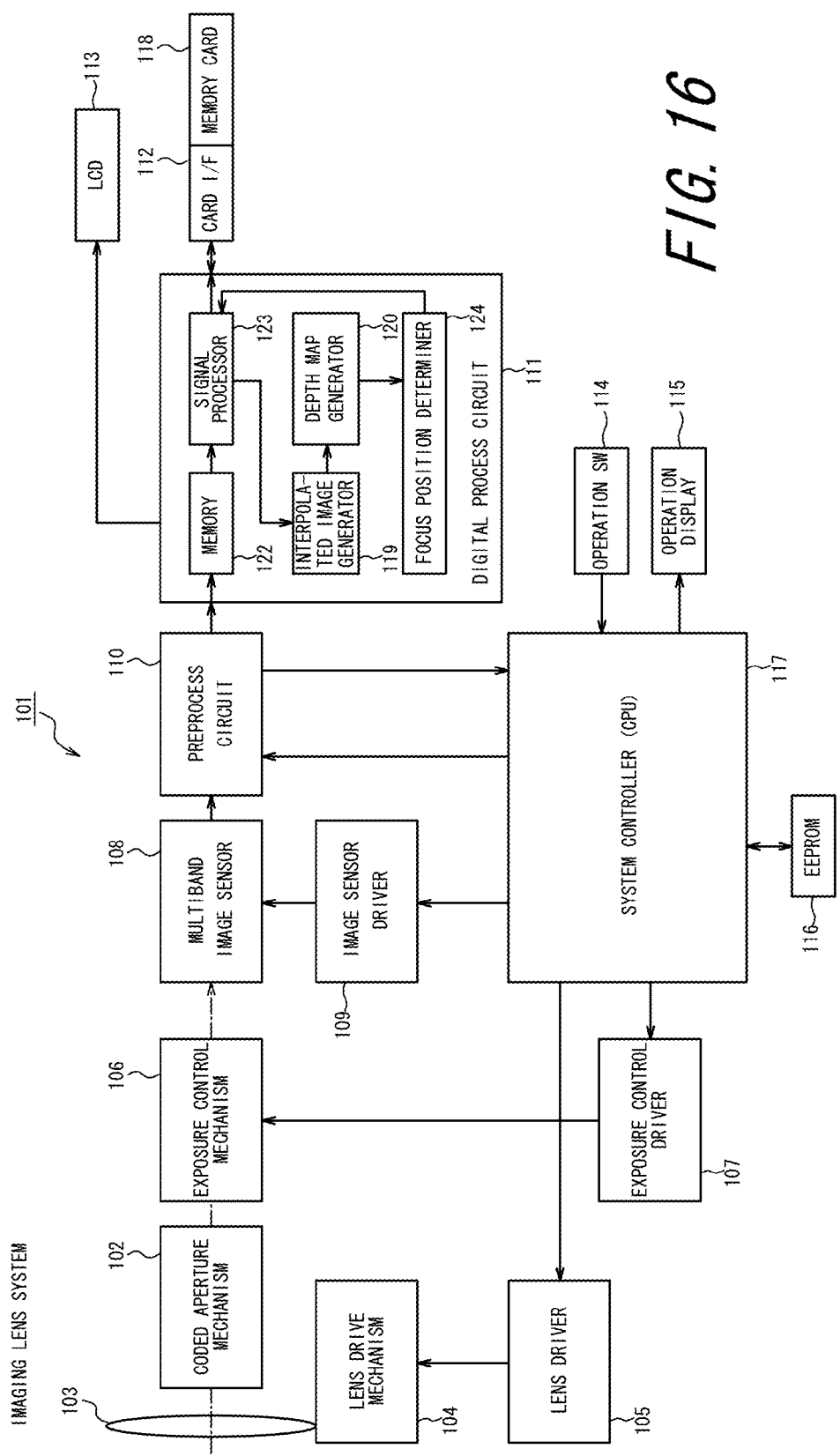
FIG. 16 is a block diagram illustrating a configuration of an imaging apparatus according to a fifth embodiment of the present invention.

FIG. 16 is a block diagram illustrating a configuration of an imaging apparatus according to the fifth embodiment of the present invention. The imaging apparatus 101 according to this embodiment is different from that of the first embodiment in configuration of the functional block in the digital process circuit 111 and processing thereof. Specifically, processing in the interpolated image generator 119 is different, and further, a focus position determiner 124 is provided in place of the depth of field changed image generator 121. Other configurations are similar to that of the first embodiment. Accordingly, the same constituent elements are denoted by the same reference symbols and description thereof is omitted.

FIG. 17 is a flowchart for illustrating an AF operation processing. The interpolated image generator 119 reads RAW data obtained by the multiband image sensor 108 (Step S1401), and performs upsampling of image data obtained through the high-density first pixel and second pixel (infrared pixel), so as to generate interpolated images (Step S1402). At this time, for the purpose of increasing the processing speed, the data may be sampled and read out, and upsampling may be performed thereon.

Then, a depth map is generated based on the interpolated images, which are generated in Step S1402 based on the first pixel and the second pixel (infrared pixel) (Step S1403). In the process flow of the first embodiment shown in FIG. 5, demosaicing processing is necessary as Step S503. However, in the case of perform processing only for AF operation, the step of demosaicing processing is omitted because only the depth map information needs to be obtained.

Next, a focus position is obtained based on the distance information of the depth map (Step S1404). In the processing of Step S1404, for example, similarly to the case of detecting the main subject region in the fourth embodiment, the focus position may be obtained assuming that a main subject can be found at a distance where the pixel count becomes maximum, with reference to the histogram (see FIG. 15) showing a relation between the subject distance and the pixel count.

Then, the lens driver 105 actually drives lenses in the imaging lens system 103, to thereby complete the focusing operation (Step S1405).

Through the above-mentioned processings, AF processing can be performed at higher speed as compared to the contrast AF method, without using a dedicated sensor such as a phase difference AF. Further, there is no need to drive lenses in order to converge the lens positions to a focus position, which leads to an advantage that a video image can be taken without getting out of focus.

This embodiment includes the focus position determiner in place of the depth of field changed image generator of the first embodiment. However, the depth of field changed image generator and the focus position determiner may both be provided in the same imaging apparatus, so that the imaging apparatus is adapted to generate a depth of field change image of the first embodiment while performing the AF operation of this embodiment at the same time.

The present invention is not limited to the above-mentioned embodiments, and may be subjected to various modifications and alterations. For example, part of the function of the interpolated image generator 119, the depth map generator 120, and the depth of field changed image generator 121 in the digital process circuit 111 may be disposed in a processing apparatus provided separately from the imaging apparatus 101. In such a case, the imaging apparatus 101 passes over, for example, RAW data on a visible light image and an infrared image to the processing apparatus, and the processing apparatus performs processings of, for example, generating a depth map and an all-in-focus image.

DESCRIPTION OF SYMBOLS 101 imaging apparatus
102 coded aperture mechanism
103 imaging lens system
104 lens drive mechanism
105 lens driver
106 exposure control mechanism
107 exposure control driver
108 multiband image sensor
109 image sensor driver
110 preprocess circuit
111 digital process circuit
112 card interface (card I/F)
113 LCD image display system
114 operation switch (operation SW)
115 operation display system
116 nonvolatile memory
117 system controller
118 memory card
119 interpolated image generator
120 depth map generator
121 depth of field changed image generator
122 memory
123 signal processor
124 focus position determiner
C1 to C6 color filter

The invention claimed is:

1. An imaging apparatus, comprising:
   an image sensor with a light receiving surface which includes two-dimensional arrays of at least three visible light pixels and an infrared pixel, the visible light pixels having sensitivity in different visible light wavelength ranges, the infrared pixel having sensitivity in the infrared wavelength range;
   a coded aperture which is disposed on the light receiving surface side of the image sensor and blocks, using a predetermined shape in a partial aperture area of a whole aperture area, light in one of the wavelength range in which the at least three visible light pixels have sensitivity and the wavelength range in which the infrared pixel has sensitivity, while directly transmitting light in the other wavelength range through the whole aperture area; and
   a processor for processing an image obtained by the image sensor,
   wherein the processor has a depth map generator for generating a depth map based on pixel signals obtained from the pixels, of one of the at least three visible light pixels and the infrared pixels, corresponding to the light in the one wavelength range which the partial aperture area of the coded aperture has blocked and the light which the coded aperture directly transmitted in an area other than the partial aperture area, and on the pixel signals obtained from the other pixels corresponding to the light in the other wavelength range which the whole aperture area of the coded aperture has directly transmitted,
   wherein the processor is further configured:
   to generate a blurred image as an interpolated image of the visible light image obtained through the visible light pixels, by using, as a reference image, an image obtained through the infrared pixel; and
   to generate, using the depth map, an image by changing the depth of field of the blurred image, and
   wherein the coded aperture acts on light in the wavelength range in which the infrared pixel has sensitivity.

2. The imaging apparatus according to claim 1, wherein the infrared pixel is equal to or higher in pixel density as compared to the at least three visible light pixels.

3. The imaging apparatus according to claim 1,
   wherein the one visible light pixel and the infrared pixel are higher in pixel density than any other pixel of the at least three visible light pixels excluding the one visible light pixel.

4. The imaging apparatus according to claim 1,
   wherein an imaging lens is driven, based on the depth map, to perform focus adjustment.

5. The imaging apparatus according to claim 1, wherein the image sensor includes four or more visible light pixels.

6. The imaging apparatus according to claim 1, wherein the coded aperture is adapted to be capable of switching the wavelength ranges to act on, between the wavelength range in which the infrared pixel has sensitivity and the wavelength ranges in which the at least three visible light pixels have sensitivity.

7. The imaging apparatus according to claim 1, wherein the processor generates an all-in-focus image based on the depth map generated in the depth map generator.

8. An imaging apparatus, comprising:
   an image sensor with a light receiving surface which includes two-dimensional arrays of at least three visible light pixels and an infrared pixel, the visible light pixels having sensitivity in different visible light wavelength ranges, the infrared pixel having sensitivity in the infrared wavelength range;
   a coded aperture which is disposed on the light receiving surface side of the image sensor and blocks, using a predetermined shape in a partial aperture area of a whole aperture area, light in one of the wavelength range in which the at least three visible light pixels have sensitivity and the wavelength range in which the infrared pixel has sensitivity, while directly transmitting light in the other wavelength range through the whole aperture area; and a processor for processing an image obtained by the image sensor, wherein the processor has a depth map generator for generating a depth map based on pixel signals obtained from the pixels, of one of the at least three visible light pixels and the infrared pixels, corresponding to the light in the one wavelength range which the partial aperture area of the coded aperture has blocked and the light which the coded aperture directly transmitted in an area other than the partial aperture area, and on the pixel signals obtained from the other pixels corresponding to the light in the other wavelength range which the whole aperture area of the coded aperture has directly transmitted, wherein the processor is further configured:

to generate, by using, as a reference image, an image obtained through one visible light pixel of the at least three visible light pixels, a blurred image as an interpolated image of the visible light image; and to generate, using the depth map, an image by changing the depth of field of the blurred image, and wherein the coded aperture acts on light in a wavelength range in which the at least three visible light pixels have sensitivity.

9. An imaging apparatus, comprising:

an image sensor with a light receiving surface which includes two-dimensional arrays of at least three visible light pixels and an infrared pixel, the visible light pixels having sensitivity in different visible light wavelength ranges, the infrared pixel having sensitivity in the infrared wavelength range;

a coded aperture which is disposed on the light receiving surface side of the image sensor and blocks, using a predetermined shape in a partial aperture area of a whole aperture area, light in one of the wavelength range in which the at least three visible light pixels have sensitivity and the wavelength range in which the infrared pixel has sensitivity, while directly transmitting light in the other wavelength range through the whole aperture area; and a processor for processing an image obtained by the image sensor, wherein the processor has a depth map generator for generating a depth map based on pixel signals obtained from the pixels, of one of the at least three visible light pixels and the infrared pixels, corresponding to the light in the one wavelength range which the partial aperture area of the coded aperture has blocked and the light which the coded aperture directly transmitted in an area other than the partial aperture area, and on the pixel signals obtained from the other pixels corresponding to the light in the other wavelength range which the whole aperture area of the coded aperture has directly transmitted, wherein the processor is further configured:

to generate, by using, as a reference image, an image obtained through one visible light pixel of the at least three visible light pixels, an interpolated image of the visible light image; and to generate, by using the depth map, a blurred image by changing the depth of field of the interpolated image, and wherein the coded aperture acts on light in the wavelength region in which the infrared pixel has sensitivity.

* * * * *